United States Patent [19]

Cassano

[11] Patent Number: 4,565,685
[45] Date of Patent: Jan. 21, 1986

[54] AIR SEPARATION WITH TEMPERATURE AND PRESSURE SWING

[75] Inventor: Anthony A. Cassano, Allentown, Pa.

[73] Assignee: Air Products and Chemicals, Inc., Allentown, Pa.

[21] Appl. No.: 651,181

[22] Filed: Sep. 14, 1984

[51] Int. Cl.[4] ............................................. C01B 13/00
[52] U.S. Cl. ................................ 423/579; 423/210.5; 423/219
[58] Field of Search ...................... 423/579, 219, 210.5

[56] References Cited

U.S. PATENT DOCUMENTS

| | | | |
|---|---|---|---|
| 3,479,261 | 11/1969 | Heredy | 423/210.5 |
| 4,132,766 | 1/1979 | Erickson | 423/219 |
| 4,287,170 | 9/1981 | Erickson | 423/219 |
| 4,340,578 | 9/1982 | Erickson | 423/219 |
| 4,421,530 | 12/1983 | Dalton et al. | 423/219 |
| 4,521,398 | 6/1985 | Erickson | 423/579 |
| 4,526,775 | 7/1985 | Cassano | 423/579 |
| 4,529,577 | 7/1985 | Chen et al. | 423/579 |

Primary Examiner—John Doll
Assistant Examiner—Wayne A. Langel
Attorney, Agent, or Firm—Geoffrey L. Chase; E. Eugene Innis; James C. Simmons

[57] ABSTRACT

A chemical absorbent air separation process is set forth which uses a temperature swing absorption-desorption cycle in combination with a pressure swing wherein the pressure is elevated in the desorption stage of the process.

11 Claims, 1 Drawing Figure

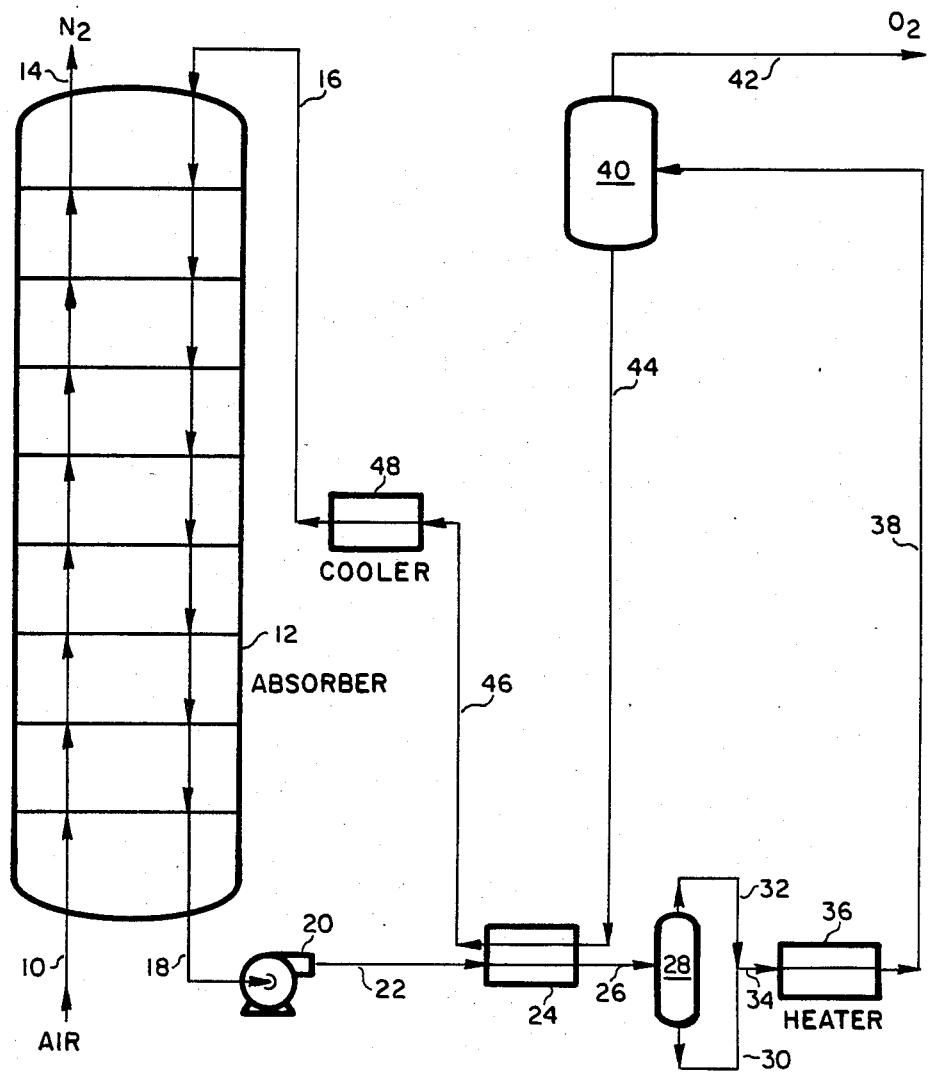

AIR SEPARATION WITH TEMPERATURE AND PRESSURE SWING

TECHNICAL FIELD

The present invention is directed to the separation of air into oxygen and nitrogen using a chemical absorbent for the oxygen. More specifically, the present invention is directed to the use of such an absorption separation wherein the desorption cycle is performed with a positive temperature and pressure swing.

BACKGROUND OF THE PRIOR ART

The separation of air has been practiced using sorption and cryogenic processes. These processes are generally applicable to recovering large percentages of the constituents of air, namely; nitrogen and oxygen. However, sorption and cryogenic air separation techniques are highly energy intensive, because of the large regeneration costs involved in sorption and the high pressure low temperature conditions necessary in cryogenic separation processes.

It has been known to separate oxygen from nitrogen in air with various chemical absorption media. Numerous chemical interactions of oxygen from air are known to occur in nonreversible manners. Additionally, chemical reactions with oxygen from air have been known to occur in a limited number of reversible interactions. However, most of these reversible interactions of chemical agents with oxygen are adequate for the recovery of only a relatively small percentage of the oxygen in air and thus the recovery techniques are less than desirable for a commercial, continuous operation. The use of alkali metal nitrites and nitrates in a mixture as chemical agents for the absorptive separation of oxygen from air has been known to provide a viable alternative for a reversible chemical absorption separation procedure.

In U.S. Pat. No. 4,132,766, a process for the separation of oxygen from air in a regenerative process is set forth. Air is contacted with a molten alkali metal salt mixture which constitutes an oxygen acceptor. The oxidized oxygen acceptor is removed and disassociated from the oxygen to regenerate free oxygen from the acceptor. The regenerated acceptor can then be recycled for further oxidation. The disassociation reaction is stated to be caused by reducing the pressure and/or supplying heat. Stripping gases may also be utilized to assist the disassociation of oxygen from the oxygen acceptor.

In U.S. Pat. No. 4,287,170, a process is set forth for the recovery of nitrogen and oxygen separately from air. The process utilizes a first absorption and desorption cycle in which oxygen oxidizes a molten alkali metal salt mixture and the salt is subsequently treated to drive off the recovered oxygen. The effluent from the absorption zone, which contains residual oxygen, is then passed to a second absorption zone in which residual oxygen is removed by contact with a scavenger, such as manganese oxide. The effluent from this absorption zone constitutes a commercially pure nitrogen product. The oxidized scavenger is reduced by contact with a reducing gas which produces an exhaust effluent containing residual oxygen and reducing gas in a mixture as a by-product of impure composition. The patent recites the use of pressure swing. i.e. absorption pressure higher than desorption pressure and temperature swing. i.e. absorption temperature lower than desorption temperature, or any combination of the two for the removal of oxygen from the absorption media.

U.S. Pat. No. 4,340,578 discloses another process for the separation of air into oxygen and an oxygen depleted stream, wherein air is compressed, heated and contacted with an alkali metal salt mixture to oxidize the salt and produce an oxygen-depleted effluent stream. The oxidized salt mixture is then treated in a desorption zone to recover an oxygen product. The regenerated salt mixture is recycled to the absorber or contact zone. The effluent from the absorption zone, which constitutes oxygen-depleted nitrogen gas, is then combusted with fuel and expanded in heat exchange against process streams in order to provide the necessary heat for the reactions and the necessary power for the compression of feed air and product oxygen. The patent in the description of its best mode indicates the combined use of a temperature swing, i.e. low absorption temperature, high desorption temperature and pressure swing, i.e. high absorption pressure, low desorption pressure.

The present invention provides an improved process for the recovery of oxygen and nitrogen from air using the molten alkali metal salt mixtures of the above prior art wherein a more efficient absorption desorption separation cycle is utilized to provide a more efficient recovery of high pressure oxygen.

SUMMARY OF THE INVENTION

The present invention is directed to a continuous process for separating air into oxygen and nitrogen comprising the repeated steps of contacting feed air with an oxygen acceptor mixture of alkali metal nitrite and nitrate salts in an absorption zone at relatively low temperature and pressure to absorb oxygen from the feed air and oxidize the acceptor, removing an oxygen-depleted nitrogen-rich stream from the absorption zone, separately releasing the absorbed oxygen from the acceptor at elevated temperature and increased pressure in a desorption zone so as to regenerate the oxygen acceptor and generate high pressure product oxygen and recycling the oxygen acceptor to the absorption zone after reducing its temperature and pressure to absorption zone conditions.

Preferably the alkali metal salt mixture comprises a molten solution of sodium and potassium cations and an anion composition of 50–94% nitrate, 4–25% nitrite and combined peroxide, oxide and superoxide wherein the oxides are present in less than 1 mole% based on sodium peroxide.

Preferably the process of the present invention is operated with a temperature in the contact zone in the range of 900° to 1100° F. and a temperature in the desorption zone of 1150° to 1200° F. The change in temperature between the absorption zone and the desorption zone should preferably be in the range of 150° to 300° F.

Preferably in the process of the present invention, the pressure in the absorption zone should be in the range of 20 to 100 psia and the pressure in the desorption zone should be in the range of 30 to 110 psia. The pressure increase from the absorption zone to the desorption zone should be in the range of 10 to 50 psia.

Optimally the absorption zone should be at approximately 60 psia and 950° F. The desorption zone should be approximately 70 psia and 1200° F.

BRIEF DESCRIPTION OF THE DRAWING

The FIGURE is a schematic flowscheme of the process of the present invention in its preferred embodiment.

DETAILED DESCRIPTION OF THE INVENTION

The present invention of chemical absorption air separation constitutes an improvement over the prior art of air separation using a molten solution of alkali metal salts of nitrate and nitrite combination as set forth in U.S. Pat. Nos. 4,132,766, 4,287,170, and 4,340,578, hereby incorporated by reference herein. The prior art in chemical air separation, as well as the above-identified art, has generally used pressure swing absorption to cyclically provide a continuous separation of the components of air and specifically oxygen from air. Pressure swing absorption has typically been considered to involve a high pressure absorption wherein the pressure drives the absorbed component on to the absorbent in combination with a low pressure desorption in which the reduction in pressure removes or flashes the absorbed component from the absorbent. Typically, reversing the pressure swing so that low pressure absorption occurs in conjunction with high pressure desorption would be a contrary technique from the prior art teachings and previously known efficient procedures for separating the largest quantities of gas mixture components.

In addition, the known chemical absorption separation technologies have utilized temperature swing cycles wherein low temperature absorption is used in conjunction with high temperature desorption. The low temperature absorption allows the desired absorbed species to be contacted and associated with the absorbent at low volatility. The desorption then occurs with the release of the absorbed component from the absorbent by increased temperature which heightens its volatility. Again, this swing from low to high temperature from absorption to desorption sequence is a well recognized trait in cyclic separation systems using absorption-desorption media.

The present invention departs from these known prior art teachings by utilizing a unique combination of temperature swing and pressure swing absorption-desorption sequence procedures. The temperature swing is conducted in the traditional manner wherein low temperature absorption is used in conjunction with high temperature desorption. However, the concurrent pressure swing utilized in the process of the present invention uses low pressure absorption in conjunction with high pressure desorption, the exact opposite of the teachings of the prior art, to provide the unique separation cycle of the present invention.

It has been found that the combination of temperature swing used with pressure swing, the pressure swing operating in a reverse swing from traditional teachings, provides a unique eificiency in the production of high pressure product. This unique aspect of the present invention will be described in greater detail below, but in summary the oxygen component of the feed air stream to be separated is absorbed on a molten and therefore liquid absorbent and can be pumped to elevated pressure in that state by very efficient operation of a pump situated in the effluent stream of the absorber. After being pumped to elevated pressure in the liquid state, the oxidized absorbent carrying the oxygen phase of the separated air is then subjected to high temperature desorption in which high pressure oxygen is evolved from the regenerating absorbent and leaves the process at a relatively high pressure and high temperature in comparison to the techniques known in the prior art. This process of the present invention provides high pressure oxygen gas at the pressurization power requirements of the liquid medium rather than the pressurization power requirements of a compressor operating on a gaseous product. With the known efficiencies of pumps in contrast to compressors for producing high pressure product, the enhancement in producing a high pressure oxygen product from a chemical absorption separation of air can be well appreciated.

The present invention will now be described in greater detail with reference to the preferred embodiment illustrated in the drawing. In the FIGURE, an absorber 12 is shown constituting a multitiered or multitray absorption zone comprising a column with an air inlet and an absorbent inlet. Air at ambient or elevated pressure and elevated temperature is introduced in line 10 into the absorption zone of the absorber 12. In multiple staged contacts, the air interacts with the absorbent, which preferably comprises a molten solution of alkali metal salt of a cation composition of sodium and potassium cations and an anion composition of 50-94% nitrate, 4-25% nitrite and combined peroxide, oxide and superoxide wherein the oxides are present in less than 3 mole% based on sodium peroxide, preferably less than 1 mole% based on sodium peroxide. Oxygen is bound to the absorbent to a greater extent through each stage of the absorption until approximately 90% of the oxygen in the feed air has been absorbed. The oxygen depleted airstream is then removed in line 14 from the absorber 12 comprising a nitrogen rich stream. This nitrogen rich stream could be combusted with fuel to provide power for the process as set forth in U.S. Pat. No. 4,340,578 or it could be further purified with an additional absorbent or scavenger for the residual oxygen to provide a pure nitrogen product as set forth in U.S. Pat. No. 4,287,170.

The oxidized absorbent or oxygen acceptor comprising the molten solution of alkali metal nitrate and nitrite is removed in line 18 as an oxidized liquid phase absorbent. The absorbent is typically at a temperature of 950° F. and a pressure of 60 psia. The liquid oxidized absorbent is then elevated in pressure by pump 20 such that the effluent in line 22 is at a temperature of ~950° F. and a pressure of 85 psia. The pump 20 generally has a low power requirement in the range of 0.3 HP/short ton of $O_2$ in contrast to a compressor that could be installed in a downstream line 42 of the oxygen product which would require an energy input in the range of 2.3 HP/short ton of $O_2$.

The high pressure oxidized absorbent or oxygen acceptor in line 22 is introduced into a heat exchanger 24 wherein the oxidized high pressure absorbent is warmed by regenerated, oxygen-lean absorbent in line 44. The high temperature, high pressure oxidized absorbent in line 26 is then introduced into a phase separator 28 for the purpose of liquid-vapor distribution to heat exchanger 36. The vapor phase is removed in line 32 while the liquid phase is removed in line 30. The streams are then recombined in line 34 and subjected to additional heating in an externally heated heat exchanger 36. Preferably, the external heat source is waste heat or fuel generated from a process which uses the oxygen product of the present invention. Typically, the heat exchanger 36 elevates the temperature of the oxidized absorbent in line 38 to a temperature of 1200° F. The oxidized, high temperature, high pressure absorbent is then introduced into desorption vessel 40 constituting a desorption zone wherein the absorbent is separated from the absorbed oxygen to provide a lean regenerated absorbent or oxygen acceptor which is removed as a molten liquid phase in line 44 and a high pressure, high temperature gaseous oxygen product removed as a vapor phase in line 42 at a pressure of 70 psia and a temperature of 1200° F.

The lean regenerated absorbent in line 44 is then cooled in heat exchanger 24 while rewarming the oxidized absorbent in line 22. The regenerated and lean absorbent in line 46 is at a temperature of 1000° F. and a pressure of 69 psia. Further cooling is required in order to effect the desirable absorption level, and therefore, the regenerating absorbent is introduced into a heat exchanger 48 which provides further cooling of the regenerating lean absorbent. The heat exchanger 48 may be driven by production of steam or preheating of air feed. The regenerated lean absorbent is still in the liquid state and at a temperature of 900° F. and a pressure of 60 psia. The regenerated absorbent or oxygen acceptor now in line 16 is reintroduced into the absorber 12 to continue the cyclic absorption of oxygen in the absorption zone within the absorber column 12.

This process as described constitutes a combination of temperature swing absorption-desorption and pressure swing absorption-desorption wherein the pressure swing is conducted in an opposite manner from that traditionally taught in the prior art. This results in the efficient production of a high pressure oxygen product. Typically, to get an oxygen product at the exit conditions of the present invention, such as a temperature of 110° F., a pressure of 70 psia and a capacity of 250 T/D, a compressor in line 42 would require 400 to 500 kw/hr of power. However, in contrast, in the present invention the pump 20 provides the high pressure oxygen at the same process conditions using a kw/hr usage of 50 to 60. This results in an efficiency improvement of ~800%.

Although the present invention has been described in a preferred embodiment utilizing a liquid pump in the effluent line of the absorber, wherein the desorption is effected substantially by a traditional temperature swing step, it is understood that any degree of pressure increase in the desorption zone, at least sufficient to provide the desired pressure of oxygen product and conductance of the liquid absorbent through the cycle flowpath would be deemed acceptable to the practice of the present invention. However, the best improvement in the chemical separation of air with resulting high pressure oxygen product will be achieved when the pumping capacity of pump 20 is in excess of that necessary to recycle the absorbent through the desorption and absorption zone and is sufficient to provide oxygen at a desired high pressure without unduly effecting the absorption and desorption conditions. It is further understood that as the pressure of the absorbent cycle is increased it will be necessary to increase the pressure on the feed air introduced into the absorber 12. This penalty will increase with increasing pressures and may well constitute a limitation on the extent of high pressure operation which can be achieved at efficient energy levels in contrast to the prior art techniques for such separations.

Finally, although the present invention has been describe as being particularly beneficial when used in conjunction with a separate process which is an oxygen user and a waste heat supplier such that the oxygen product has a ready end use and a source of high temperature heat for the desorption cycle of the temperature swing aspect of the present invention can be realized, it is also appreciated that the process can be used with beneficial integration in a stand alone or other utility wherein oxygen may not be the necessary source material and waste heat may not be available from a proximate industrial application. In that case, energy for the total operation of the chemical air separation process of the present invention will be increased by the amount necessary to produce the high temperature desorption of the temperature swing aspect of the present invention.

The present invention has been described with regard to a specific preferred embodiment which those skilled in the art will be able to contemplate obvious variants therefrom. Therefore, it is contemplated that those variations are within the scope of the present invention which scope should be ascertained not from the preferred embodiment but from the claims which follow.

I claim:

1. A continuous process for separating air into oxygen and nitrogen comprising the repeated steps of contacting feed air with an oxygen acceptor mixture of alkali metal nitrite and nitrate salts in an absorption zone at relatively low temperature and pressure to absorb oxygen from the feed air and oxidize the acceptor, removing an oxygen-depleted nitrogen-rich stream from the absorption zone, pumping the oxidized acceptor to an elevated pressure, separately releasing the absorbed oxygen from the acceptor at elevated temperature and the elevated pressure in a desorption zone so as to regenerate the oxygen acceptor and generate high pressure product oxygen and recycling the oxygen acceptor to the absorption zone after reducing its temperature and pressure to absorpation zone conditions.

2. The process of claim 1 wherein the oxygen-depleted, nitrogen-rich stream constitutes a commercially pure nitrogen product.

3. The process of claim 1 wherein the oxidized acceptor is heat exchanged against the regenerated oxygen acceptor.

4. The process of claim 1 wherein the change in temperature from the absorption zone to the desorption zone is in the range of 150 to 300° F.

5. The process of claim 1 wherein the change in pressure from the absorption zone to the desorption zone is in the range of 10 to 50 psia.

6. The process of claim 1 wherein the change in temperature from the absorption zone to the desorption zone is approximately 250° F.

7. The process of claim 1 wherein the change in pressure from the absorption zone to the desorption zone is approximately 10 psia.

8. The process of claim 1 wherein the absorption pressure is approximately 60 psia.

9. The process of claim 1 wherein the absorption temperature is approximately 950° F.

10. The process of claim 1 wherein the desorption pressure is approximately 70 psia.

11. The process of claim 1 wherein the desorption temperature is approximately 1200° F.

* * * * *

UNITED STATES PATENT AND TRADEMARK OFFICE
CERTIFICATE OF CORRECTION

PATENT NO. : 4,565,685

DATED : January 21, 1986

INVENTOR(S) : Anthony A. Cassano

It is certified that error appears in the above-identified patent and that said Letters Patent is hereby corrected as shown below:

At column 1, line 4:

--The Government of the United States of America has rights in this invention pursuant to Contract No. DE-AC07-82CS40544 awarded by the U.S. Department of Energy.--

Signed and Sealed this

Twenty-fourth Day of May, 1988

*Attest:*

DONALD J. QUIGG

*Attesting Officer*      *Commissioner of Patents and Trademarks*